United States Patent [19]
Bergey

[11] Patent Number: 5,108,227
[45] Date of Patent: Apr. 28, 1992

[54] TELESCOPING FROSTPROOFING SLEEVE EXPANDABLE TO FROST DEPTHS OF AREA

[76] Inventor: Michael J. Bergey, 4616 Porter Center Rd., Lewiston, N.Y. 14092

[21] Appl. No.: 709,370

[22] Filed: Jun. 3, 1991

[51] Int. Cl.$^5$ .............. F16L 57/00; F16L 55/02; F16L 7/00; F16L 13/04
[52] U.S. Cl. .................... 405/154; 405/216; 405/217; 405/231; 285/115; 285/230; 285/921; 137/375; 138/32
[58] Field of Search ............. 405/133, 211, 216, 217, 405/231, 232, 154; 285/921, 230, 31, 114, 115, 116; 138/27, 28, 32, 120, 155; 137/301, 375

[56] References Cited

U.S. PATENT DOCUMENTS

| | | | |
|---|---|---|---|
| 1,436,978 | 11/1922 | Camp | 405/216 X |
| 2,164,108 | 6/1939 | Greulich | 405/216 |
| 2,766,054 | 10/1956 | Everhart | 285/230 |
| 2,816,782 | 12/1957 | Anderson | 285/230 X |
| 2,999,699 | 9/1961 | Lafferty | 285/230 X |
| 3,059,941 | 10/1962 | Kaynor et al. | 285/230 X |
| 3,313,669 | 4/1967 | Say | 285/230 X |
| 3,809,412 | 5/1974 | Glover | 285/921 X |
| 4,114,388 | 9/1978 | Straub | 405/216 |
| 4,252,471 | 2/1981 | Straub | 405/211 |
| 4,464,083 | 8/1984 | Wathey | 405/216 |
| 4,512,683 | 4/1985 | Cosenza | 405/216 |
| 4,553,876 | 11/1985 | Arntyr et al. | 405/133 X |
| 4,585,681 | 4/1986 | Kidera et al. | 405/231 |
| 4,779,389 | 10/1988 | Landers | 405/216 X |
| 4,893,848 | 1/1990 | Melcher | 285/921 X |
| 5,015,014 | 5/1991 | Sweeney | 285/921 X |

FOREIGN PATENT DOCUMENTS 1090714  4/1955  France ................. 405/243

Primary Examiner—Dennis L. Taylor
Assistant Examiner—John Ricci
Attorney, Agent, or Firm—Wallace F. Neyerlin

[57] ABSTRACT

A sleeve covering to surround a vent pipe which is to be buried and inserted into and connected to a T-fitting trap of a sanitary sewer system is described which sleeve covering will prevent the frost or frozen earth from heaving the pipe which it surrounds. The repeating sleeve covering is basically a number of hollow vertical sections or coupling members, generally cylindrical in shape, whose inside diameter of the bottom portion of each is slightly greater than the pipe which it surrounds. Vertical movement of the sleeve sections or coupling members (one or more or all) is possible without causing any vertical movement of the pipe that the sections surround. Also, because of the particular exterior shape (frusto-conical) of the top portion of each section, the exterior forces exerted upon same by the earth when it freezes actually tends to force the sleeve sections downward rather than upward. Also, because the sleeve covering is made up of a number of coupling members, the heaving forces exerted by the earth can be restricted to act upon an individual sleeve section and/or to act upon only a limited few such sleeve sections rather than upon the entire sleeve covering. The invention also includes a novel and greatly improved method of connecting the vent pipe to the T-fitting trap of the sewer system.

13 Claims, 2 Drawing Sheets

TELESCOPING FROSTPROOFING SLEEVE EXPANDABLE TO FROST DEPTHS OF AREA

BACKGROUND OF THE INVENTION

1. Field of the Invention

This invention relates to a means for solving the problem of negating the surrounding inward pressure and upward pressure of the earth material exerted towards the outside surface of a given vertical sanitary vent pipe which is to be buried and surrounded by the earth. Such vertical sanitary vent pipes, typically made from polyvinyl chloride (pvc), are or have been installed in thousands of home lots in northern parts of the United States; and within a time span, of such as short as one year or a few years after installation, upward pressure exerted upon such pipes by the repeated freezing and thawing of the ground near its surface causes the pipes to heave and become separated from the T-fitting traps to which they are originally connected, thereby leading to environmental and pollution problems, as are referred to in more detail hereinafter.

My pending application Ser. No. 689955, filed Apr. 23, 1991 describes an apparatus and method for helping to overcome such environmental and pollution problems by providing a novel means for re-inserting the vent pipes into their female T-fitting traps after they have been displaced therefrom by such freezing and thawing as described above. The present application is more particularly addressed to describing improved means for preventing such vent pipe displacement from occurring in the first place; and/or to improved means for re-inserting a new vent pipe into the T-fitting trap in such a way as to prevent the separation from re-occurring.

2. Description of the Related Art

A pre-examination search was carried out for any patents that might be anticipatory of applicant's invention and none were found. The search was conducted primarily in U.S. Classes 405/216; 405/217; and 405/231.

The following patents were noted in the search and the following brief comments relating to each explain why their teachings are different from the invention described in the instant patent application.

U.S. Pat. No. 4,464,083—The ice guard sleeve is not sectional as is the sleeve of the present invention. When the frost works on the sleeve of the patent, it works on the entire sleeve. When frost lifts a sleeve in the earth, the sleeve will not return to its original position because the earth friction at the lower part of the sleeve is greater as a holding factor than the ground is as a settling factor. This is not a factor in water, the sleeve environment in the patent, but it is an important factor as to the sleeve design and its purpose in the present invention.

U.S. Pat. No. 4,512,683—The piling is designed for water; not sectional vertically, (as is the sleeve of the present invention) but only horizontally, to be designed in two halves to be put around the pile. The sleeve is split for installation purposes, not for protectional function; if frost acted upon the sleeve of this patent in an earth environment, once lifted it would not re-settle for same reason as stated above re U.S. Pat. No. 4,464,083; also because of its corrugated nature, the frost might split it in half because the lower section would be anchored to the ground while the frost would act on the upper section causing a tensile stress on the entire unit.

U.S. Pat. No. 4,585,681—The pile of this patent requires a base mount to the pipe to secure the sleeve. The sleeve is not sectional, but a bellow stretching design and the frost forces liquid within its liner vertically above the ground to absorb the ground expansion. This base mount would have to be done prior to ground covering. This is in contrast to the sleeve of the present invention which has no physical anchoring to the pipe which it is protecting. This possible fatigue of the bellows caused by the expansion and contraction of the frost action in the long term could rupture the outer or inner membrane rendering the sleeve ineffective.

U.S. Pat. No. 4,818,148—The unit of this patent tries to reduce friction on the pile by coating the pile; which isn't effective enough to reduce the frost grip on an already smooth pvc vent pipe as is necessary to maintain vent pipe stability as used or required in the present application. The entire sleeve is acted upon; when frost moves the protector when it gets a grip on it, it moves the entire protector due to the fact it is not sectional.

The frost-proof sleeve of the present invention will work within a ½" larger radius duct tunnel than the tubular pipe that it originally surrounds; None of the sleeves in the above patents will do this. Also, in the invention of this application, the surface area of the original pipe is reduced from a 4" diameter pipe to 3" (25% reduction), which in turn reduces the gripping ability of the frost—this is not true of the designs in the above patents.

The design of none of the patents above (which were the references considered the closest art relevant to the present invention found in the search) uses a fixed frusto-conical design (an important aspect of each of the sleeve sections of the present invention) as its primary frost negating form. Because of its dominant frusto-conical nature, the frost effect actually wedges the sleeve downwards rather than lifting it up.

SUMMARY OF THE INVENTION

The basic idea of the invention is to devise a sleeve covering to surround the vent pipe which is to be buried which sleeve covering will prevent the frost or frozen earth from heaving the pipe which it surrounds. The repeating sleeve covering is basically a number of a hollow vertical sections or coupling members, generally cylindrical in shape, whose inside diameter of the bottom portion of each is slightly greater than the pipe which it surrounds. Vertical movement of the sleeve sections or coupling members (one or more or all) is possible without causing any vertical movement of the pipe that the sections surround. Also, because of the particular exterior shape (frusto-conical) of the top portion of each section, the exterior forces exerted upon same by the earth when it freezes actually tends to force the sleeve sections downward rather than upward. Also, because the sleeve covering is made up of a number of coupling members, the heaving forces exerted by the earth can be restricted to act upon an individual sleeve section and/or to act upon only a limited few such sleeve sections rather than upon the entire sleeve covering. Also, because most of the time the sleeve covering will consist of a number of telescoping sections, all of the same shape and size, this permits or allows for one or more sleeve sections to be added to the sleeve covering to adjust for the varying frost depths of each region to be encountered.

Preferably each section of the sleeve covering is identical in dimension, the exterior shape of the top portion thereof being frusto-conical in vertical cross section and each sleeve having a hollow cylindrical interior. The sections telescope within each other and each frustrum shaped top portion of each section tapers for most of its length as illustrated in the drawing figures which follow, the top of each of which sections can be visualized as having been cut off by a plane parallel to the base. Lastly, the material preferred is rigid polyethylene, which by chemical nature is somewhat waxy or slippery, thus tending to minimize the potential gripping forces of the earth duct acting against the sleeve's outer surface.

BRIEF DESCRIPTION OF THE DRAWINGS

The invention can best and more clearly be understood by reference to the attached drawings wherein.

DETAILED DESCRIPTION OF THE DRAWINGS AND OF THE PREFERRED EMBODIMENTS

Figure 1:
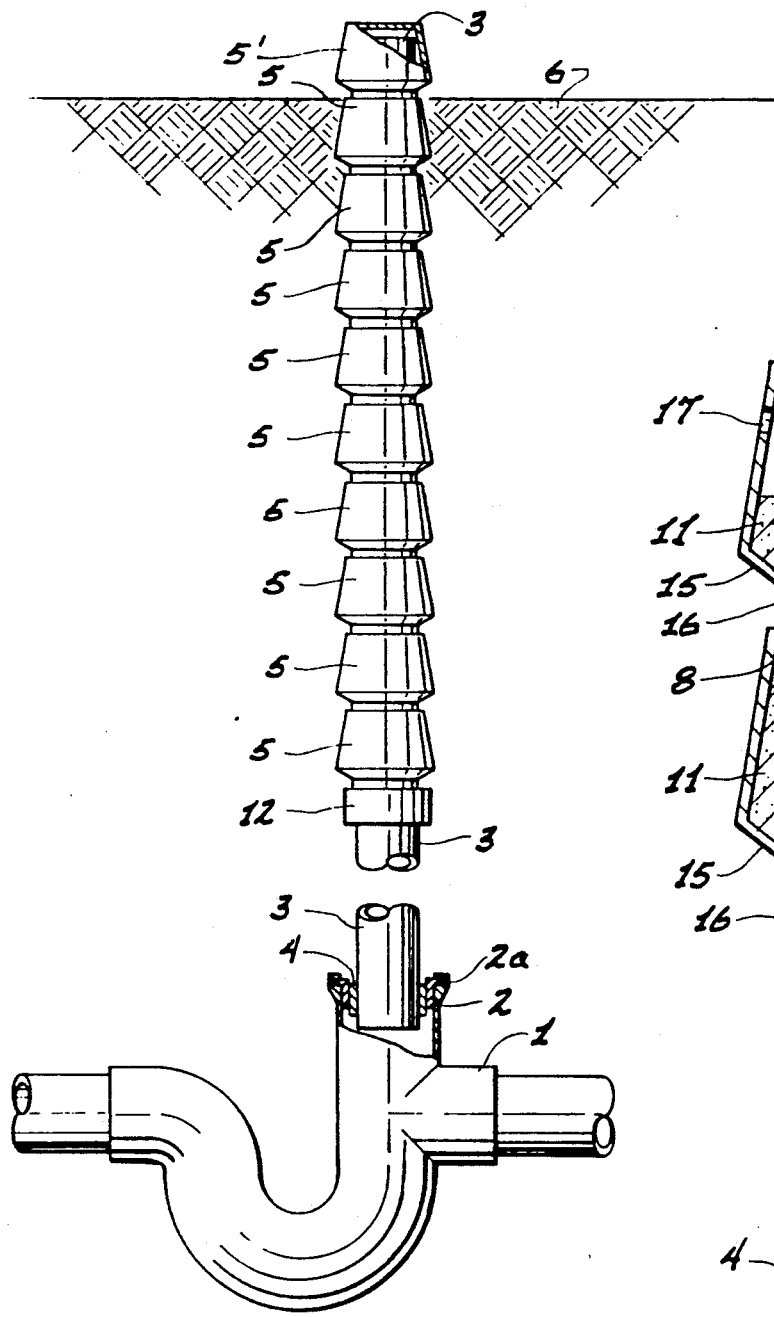
FIG. 1 is a vertical perspective (broken view) partly in section showing the telescoping frost-proofing sleeve of the present invention surrounding the vertical vent pipe which it protects, which vent pipe is further shown inserted and connected within the T-fitting trap of the sewer system involved.
Figure 1:
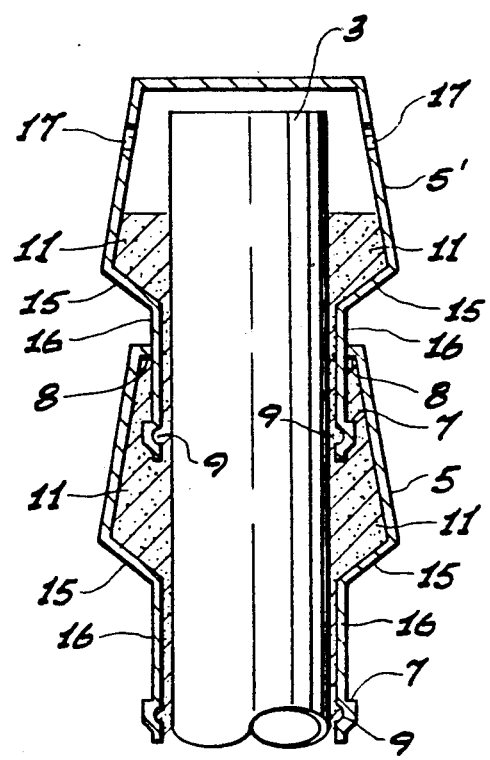
Figure 3:
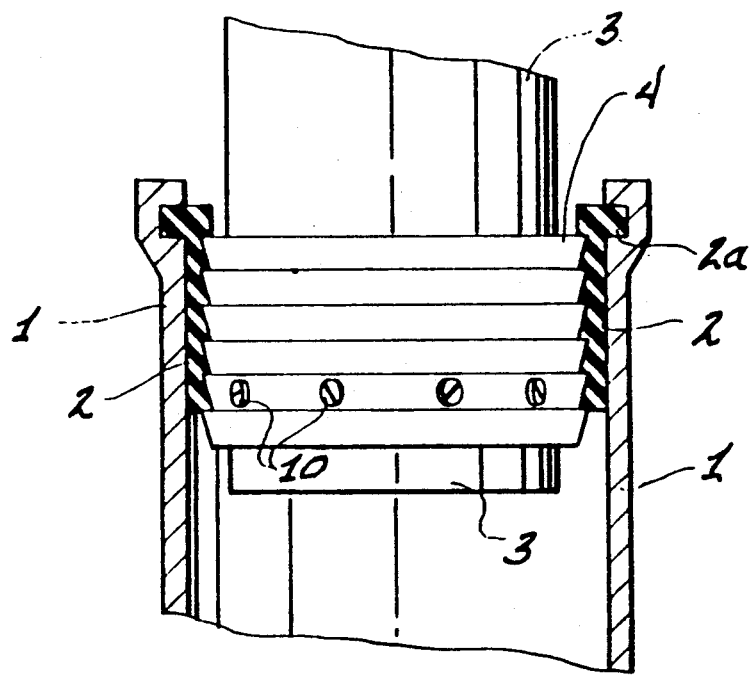
FIG. 3 is an enlarged vertical cross section showing the appearance of the vent pipe and its seal or gasket after the vent pipe has been inserted into the T-fitting trap. The trap also has a hollow seal or gasket within same into which the vent pipe with its attached surrounding gasket has been forced during installation of connecting the vent pipe into the T-fitting trap.
Figure 4:
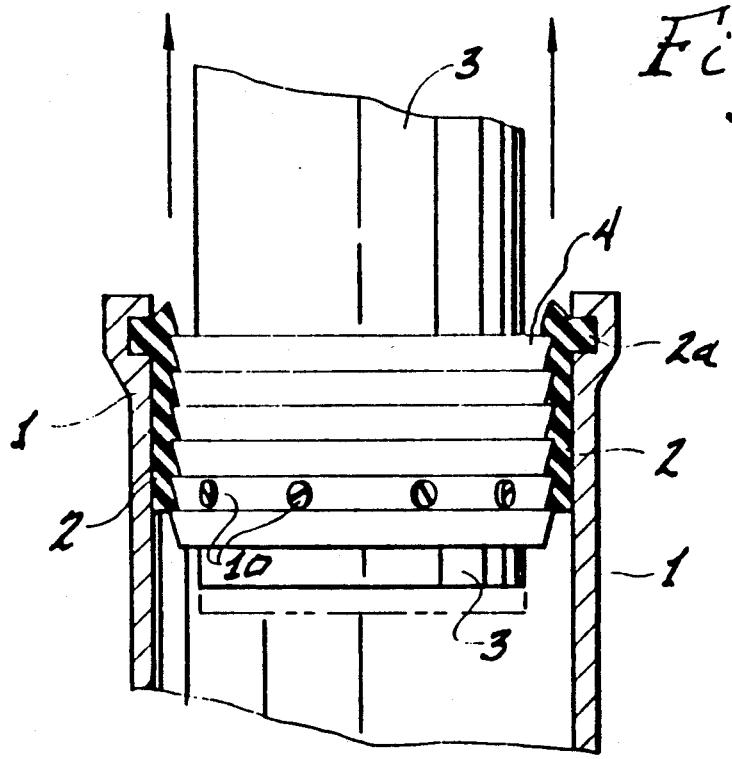
FIG. 4 is a view similar to FIG. 3 except that FIG. 4 illustrates the possible effects of upward pulling forces acting upon the connection after its installation and during freezing weather.

Referring now in more detail to FIG. 1 of the drawings, the T-fitting trap to which the vertical vent pipe is to be connected is designated by the numeral 1. The trap 1 typically has a cylindrical doughnut shaped Fernco seal ring or gasket 2 within its vertical portion for water-tightness, said gasket or ring having a rim exterior 2a which inserts into a recess (as shown) in the cast iron trap for its mechanical lock. The Fernco type seal ring 2 (44 U-401 designation) is corrugated (as shown in FIGS. 3 and 4). The inside diameter of seal ring 2 is typically 4 inches, to accommodate the insertion of 4 inch diameter schedule 35 pvc vent pipe, which has typically been used in the installation of such vent pipe to trap connections. However in the present invention, the practice intended, either to replace 4 inch pipe which has been separated from its T-fitting trap, or to make a new vent pipe to trap connection, is to employ vertical vent pipe 3 (schedule 40 pvc pipe) of a reduced diameter, such as 3 inches in diameter. The bottom of the vent pipe 3 is fitted into or surrounded with a doughnut shaped Fernco type seal ring 4 (also corrugated) (33 U-305 designation) and firmly attached thereto, such as by means of screws 10, preferably 8 screws spaced at 45 degrees around the circumference of the seal and vent pipe. The screw connections are made near the bottom corrugation of the seal ring, as illustrated in FIGS. 3 and 4.

The telescoping sleeve employed to receive the surrounding inward and upward pressure of the earth material 6 which would be exerted against the outside surface of the vertical sanitary vent pipe 3 (if it were not shielded from such pressure by the separating sleeve of the present invention) consists of a series of telescoping coupling members 5, which couplings have features which are now best described by reference to FIG. 2.

Each coupling member 5 (the top coupling is designated by 5' because it has a lid across its top and has perforations 17 for venting and is also colored differently than the other couplings) is approximately 6 inches long and possesses an inner circumferential lip 8 at its top and an external circumferential shelf or ledge 7 near its bottom, thus preventing the telescoping couplings from becoming separated vertically from each other. The frusto-conical top portion of each sleeve coupling 5 is approximately two-thirds its length; the remaining portion of the length of each coupling being the tapered portion 15 of each coupling and the cylindrical bottom portion 16 of each coupling. Particularly because of the sectional design of each coupling as just described, frost-grip on any of the upper coupling sections, because of the slide expansion vertical limits along portions 16 of each coupling being greater than the maximum frost lift that can be encountered, the overall design negates any possibility of vertical movements of the coupling sections below the sections encountering earth freezing and heaving conditions.

The couplings 5 are not attached to the vent pipe 3, but merely surround same, defining a minimum clearance spacing 9 being deliberately designed into the system as a part of the means for friction shielding the vent pipe 3 from the upward earth pressure forces caused by the repeated freezing and thawing of the ground near its surface as previously referred to. The enlarged space 11 between the couplings 5 (or 5') and vent pipe 3 is also typically filled with a suitable non-freezing vegetable shortening or grease so as to prevent water from filling part or all of the space between the inner vent pipe and the outer sleeve and to also help negate the effect of the earth pressure and friction from acting against the vent pipe.

It will also be noted that the main length of the top portion of each coupling member 5 (or 5') extends from a smaller diameter at its top to a larger diameter toward its base and that therefore the dominant earth pressures which will act upon the couplings will tend to force the sleeve couplings or sections downward rather than lifting them up or heaving them upward.

Figure 2:
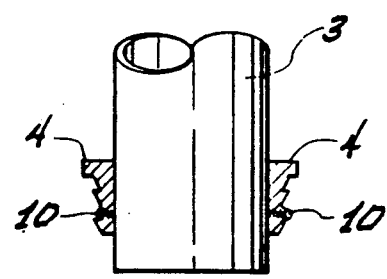
FIG. 2 is an enlarged vertical cross-sectional view of some of the sections, showing also a seal or gasket which is attached to the vent pipe near its bottom before the vent pipe is inserted into the T-fitting trap.

As illustrated in FIGS. 1 and 2, the telescoping protective sleeve consists of the top coupling 5', which is "lidded", and vented with openings or holes 17, plus nine (9) regular coupling members 5 having the features as have been described. The top coupling 5' will typically or preferably be white in color and protrude above the earth's surface for a good portion of its length. The submerged in earth couplings, particularly the one or two immediately under coupling 5' will preferably have a different color, such as red or yellow, to serve as indicators that one or more coupling members 5 (probably only the coupling member 5 beneath the top coupling 5' has been uprooted or lifted from its buried state in the earth (probably caused by faulty installation without using vegetable shortening or grease in space 11) should such an undesirable and unexpected uprooting take place after the connections described in this application have been effected. Such appearance of a coupling other than the top white coupling will thus serve to provide notice that a remedial installation of shortening in space 11 is required in the affected coupling members.

FIG. 1 also illustrates a cylindrical member 12 under the last or bottom most coupling 5 of the protective sleeve. The use of such a member, which is attached preferably by being solvent welded or glued around the circumference of vent pipe 3, is to prevent the possibility of the bottom most coupling 5 or additional couplings from going down lower or below the designated frost area or depth.

It should also be mentioned that typically member 12 will physically be above the connection between the vent pipe base and the trap by at least about one foot to about 6 feet. It should also be appreciated that less or more than 9 regular coupling members 5 may be employed in carrying out the present invention, this more or less being a decision to be made depending partly upon the weather conditions and maximum frost depths and severity of freezing and thawing expected to be encountered.

As previously pointed out, use of the present invention helps in overcoming the problem of unwanted ground water infiltration into the sanitary sewer system by preventing vent pipe up-rooting. This is very important environmentally since typically, in times of rapid thaws or heavy rains, the flow rates of influent sanitary waste coupled with ground water into the municipal water treatment facilities average 3 to 5 times the normal flow rates into the system. This excess water infiltration into the network of sewer drains is primarily from uprooted sanitary vent risers, which allows any surrounding ground water to drain into the T-fitting traps. Because of the sewage plant's biological bacteria mobility, excess water flows of this dimension would flush the bacteria out of the facility and render the treatment plant non-functional. Therefore the only measure that can be taken to protect the plant's necessary bacteria count is to bypass the plant partially or entirely until the excess water flows are reduced to normal rates. During this bypass the raw sewage is bypassed from the plant and channelled to the normal receiving rivers, streams or lakes.

In further reference to this infiltration problem, which is necessitating the bypass, unsanitary conditions are created as referred to above which violate local, state and federal health and environmental codes and standards.

General installation practice of connecting vent pipes into their T-fitting traps has been previously standardized throughout the gasket industry to achieve a friction fit only between the inner circumference of the gasket and the outer circumference of the vent pipe. This single gasket friction fit allows vertical slip joint movement of the seal. This connection is water tight but is less than functional when external forces can cause slip movement to the point of the pipe becoming disconnected from the T-fitting trap.

In contrast to this single gasket method, the connection of the present invention is a mechanical one which employs a second gasket as has been described, with the physical presence also of stainless steel screws (typically 8 as described) which anchor the second gasket to the vent pipe being inserted into the T-fitting trap.

The final connection completing the seal is now gasket to gasket. The directional locking of the gaskets allows only a one way movement of insertion, which locks the gaskets to each other. Beyond a one-way lock, the stretch of the gaskets between each other creates a pulling attraction if any force is applied in the direction of pipe removal, once inserted. This spring retraction is in direct contrast to previous design function which is to allow slip insertion and slip removal. Once the gasket is mechanically fixed to the pipe and the other gasket (which is designed to fit into a mechanical notch or recess in the trap) are combined, a new function is introduced which can be defined as a flexible water tight seal, the emphasis being on flexible, as pertaining to frost lift and release. A laboratory test on this united dual gasket connection (both gaskets being fixed to or into their corresponding parts) once united present a locking spring action which on a dynamometer scale created a lock tested to over 770 pounds without becoming dislodged at 1½ inch of lift. Gasket design as an independent (prior art) unit shows pipe slippage at only 44 pounds of lift and permanent movement in relation to the pipe it surrounds with as little as ¼ inch of lift; and there is no return to its original installed position. In contrast the dual mechanically fixed gasket of this invention springs back to the original position of installation.

As to the screws' placements and material of construction, they because of being exposed to moisture and a low acid condition in sewers should be made of stainless steel, so as not to rust. Tests show optimum performance is achieved when they are placed at the base of the gasket at 45° spacing totaling 8 screws per circumference. This spacing, when stressed to 770 plus pounds at 1½" of lift disbursed the pull evenly around the circumference of both gaskets. The placement of the screws at the base of the gasket creates stretching of the gaskets with insertion and a bunching or crowding of the gasket when pulled or stressed. With further stress, the screws would have to rip through the entire vertical height of the inner gasket before the pipe could be removed. Exaggerated stress tests show this gasket being stressed beyond the normal exposures of lift and pressures to be experienced in a normal placement without loss of function.

A bucket test was initiated at a site where a vertical vent riser was installed with a single gasket mechanically fixed only to the cast iron trap with a slip connection for the pipe being received. This slip connection, with its limited hold when stressed by frost allowed vertical movement upward out of the gasket allowing ground water infiltration at a rate in excess of 10 gallons per minute. This computed to over 15,000 gallons per day at just this one point of infiltration. After being retrofitted with the frost protecting sleeve and with the secondary gasket system of this invention, which is mechanically fixed to the pipe by the 8 screws as described, the infiltration was stopped completely and insurance of stability from heaving by future frost was achieved.

Because of the improved mechanical locking design, which doubles as a stretching seal which returns to its originally installed position once the stress of frost lift is withdrawn, and this combined with the frost proof sleeve, the combination assures that the future integrity of the riser vent to T-fitting trap connection and its water tight seal will not be compromised; this primarily because the frost force will now be absorbed first by the surrounding sleeve and second (in the unlikely event of faulty installation) by the mechanical combination of the dual fixed gaskets.

While the present invention has been described and illustrated in detail, various modifications may be made by those skilled in the art. It is therefore to be understood that the invention is not to be limited to the details of construction described and illustrated and it is intended by the appended claims to cover all modifications which fall within the spirit and scope of the invention.

I claim:

1. A hollow coupling member for use as one of a series of telescoping coupling members in a frostproofing sleeve to surround a vertical sanitary vent pipe which is to be buried and surrounded by the earth and wherein the sanitary vent pipe in the earth is expected to encounter repeated freezing and thawing of the earth near its surface, said coupling member having a top portion, whose external surface circumference is frusto-conical in shape, and a bottom portion whose external surface circumference is substantially cylindrical in shape, said coupling member having an internal circumferential lip at its top surface and an external circumferential shelf near its lower end so as to enable the coupling to function as a single member of a series of coupling members in the frostproofing sleeve, the interior of the coupling member having a diameter at its bottom portion only slightly greater than the diameter of the sanitary vent pipe which the coupling member is to surround, and the interior of the coupling member at its top portion having a varying diameter greater than the diameter of the vent pipe decreasing substantially linearly from the bottom of the top portion of the coupling to the top of said top portion of the coupling, thereby providing a frusto-conical shaped space between the coupling member and the sanitary vent pipe which the coupling member is to surround.

2. A coupling member according to claim 1 when rigid and fabricated from polyethylene.

3. A telescoping sanitary vent pipe protective sleeve comprising a plurality of hollow coupling members according to claim 1.

4. In combination a telescoping sanitary vent pipe protective sleeve made up almost entirely of coupling members according to claim 1, a sanitary vertical vent pipe which the sleeve surrounds, and a sleeve base member upon which the sleeve rests, said base member being circumferentially attached around the sanitary pipe.

5. A combination according to claim 4 wherein said base member is solvent welded around the vertical vent pipe.

6. A combination according to claim 4 wherein the sleeve is positioned between the vent pipe and earth and wherein the ground surface of the earth is subject to repeated freezing and thawing during a part of each year due to temperatures which prevail at the location of the sanitary vent pipe.

7. A combination according to claim 6 wherein a non-freezing substance such as grease or vegetable shortening is positioned in the space between the sanitary vent pipe and one or more of the coupling members making up the sleeve so as to prevent water from filling part or all of the space between the inner pipe and the outer sleeve.

8. A combination according to claim 4 wherein the bottom most portion of the sanitary vertical vent pipe is inserted into and coupled to a T-fitting trap in a sanitary sewer system, but wherein the connection is made in the T-fitting trap by means of a corrugated gasket being first connected around the base of the vent pipe and then being fitted into the T-fitting trap which contains an oppositely serrated corrugated gasket around its interior circumference so that the connection resists upward forces exerted upon the vent pipe-T-fitting trap connection to a substantially greater degree than if the vent pipe to T-fitting trap were lacking the corrugated gasket in corrugated gasket connection.

9. A combination according to claim 8 wherein the corrugated gasket is connected circumferentially around the base of the vent pipe by means of a plurality of stainless steel screws to prevent corrosion.

10. A combination according to claim 9 wherein 8 screws are employed spaced approximately 45 degrees apart.

11. A method of preventing or overcoming undesired seepage of ground water into a sanitary sewer system employing semi-rigid pvc vertical vent pipes which are to be buried and surrounded by the earth and wherein the sanitary vent pipe in the earth is expected to encounter repeated freezing and thawing of the earth near its surface which comprises surrounding the sanitary vent pipe with a protective sleeve made up almost entirely of coupling members according to claim 1 and a sleeve base member upon which the sleeve rests, said base member being circumferentially attached around the sanitary pipe, and inserting and coupling the bottom most portion of the vertical vent pipe to a T-fitting trap in the sewer system, but wherein the connection is made in the T-fitting trap by means of a corrugated gasket being first connected around the base of the vent pipe and then being fitted into the T-fitting trap which contains an oppositely serrated corrugated gasket around its interior circumference so that the connection resists upward forces exerted upon the vent pipe-T-fitting trap connection to a substantially greater degree than if the vent pipe to T-fitting trap were lacking the corrugated gasket in corrugated gasket connection.

12. A method according to claim 11 wherein the corrugated gasket is connected circumferentially around the base of the vent pipe by means of a plurality of stainless steel screws to prevent corrosion.

13. A method according to claim 12 wherein 8 screws are employed spaced approximately 45 degrees apart.

* * * * *